United States Patent [19]

Shelly

[11] 3,990,051

[45] Nov. 2, 1976

[54] MEMORY STEERING IN A DATA PROCESSING SYSTEM

[75] Inventor: William A. Shelly, Phoenix, Ariz.

[73] Assignee: Honeywell Information Systems, Inc., Phoenix, Ariz.

[22] Filed: Mar. 26, 1975

[21] Appl. No.: 562,313

[52] U.S. Cl. .............................................. 340/172.5
[51] Int. Cl.² ........................................... G06F 13/00
[58] Field of Search ................................ 340/172 S

[56] References Cited
UNITED STATES PATENTS

| | | | |
|---|---|---|---|
| 3,412,382 | 11/1968 | Couleur | 340/172 S |
| 3,533,075 | 10/1970 | Johnson | 340/172 S |
| 3,781,808 | 12/1973 | Ahearn | 340/172 S |
| 3,786,427 | 1/1974 | Schmidt | 340/172 S |
| 3,840,862 | 10/1974 | Ready | 340/172 S |
| 3,854,126 | 12/1974 | Gray | 340/172 S |
| 3,909,798 | 9/1975 | Wallach | 340/172 S |

*Primary Examiner*—Gareth D. Shaw
*Assistant Examiner*—James D. Thomas
*Attorney, Agent, or Firm*—J. Stanley Edwards; Nicholas Prasinos; William W. Holloway, Jr.

[57] ABSTRACT

In an input/output data processing system employing local and remote memory and paged data storage, memory steering is included in the address development, thus eliminating the need for special memory configuration logic. Words used in constructing absolute memory addresses for data fetches include address portions referencing local/remote memory, specific memory, and/or lack of memory residence for effecting a system fault procedure.

3 Claims, 4 Drawing Figures

MEMORY STEERING IN A DATA PROCESSING SYSTEM

CROSS REFERENCE TO RELATED APPLICATIONS

The following copending applications are related to the present application and are incorporated hereby by reference:

5202527 Ser. No. 562,317 filed Mar. 26, 1975, "PROCESSOR FOR INPUT-OUTPUT PROCESSING SYSTEM"

Inventors: Marion G. Porter, Garvin Wesley Patterson, William A. Shelly, Nicholas S. Lemak, 5202529 Ser. No. 562,330 filed Mar. 26, 1975, "METHOD OF GENERATING ADDRESSES TO A PAGED MEMORY"

Inventors: Garvin Wesley Patterson, Marion G. Porter.

FIELD OF THE INVENTION

This invention relates generally to electronic data processing systems, and more particularly to the method of addressing and accessing stored data in a data processing system including a plurality of memory units.

BACKGROUND OF THE INVENTION

Copending application Ser. No. 562,317 filed Mar. 26, 1975, discloses an input/output data processing system which provides communication and control functions in a larger data processing system. Particularly, the application is directed to the processor portion of the I/O system which, inter alia, develops addresses to data which may be stored in memory units utilizing known paging techniques. Paging allows the storage of data in units or pages which may be stored in local memory, remote memory, or in bulk storage.

Copending application Ser. No. 562,330 filed Mar. 26, 1975, discloses a method of generating addresses to paged memory, particularly applicable to the I/O system and processor of application Ser. No. 562,317, utilizing a page table word scratchpad and page table words which define memory locations for respective pages of data.

In the described modular I/O system, a system interface unit (SIU) interconnects various units including the I/O processor, a plurality of local memories, and a plurality of remote memories. In developing addresses to these various memory units, steering to specific units (or initiating a fault procedure for data not in memory) is required. Heretofore, processors have been provided with special memory configuration logic to facilitate fetches of data in a system employing plural memories. Not only has additional hardware been required but additional time is required in fetching data other than the time necessary for memory address development.

SUMMARY OF THE INVENTION

An object of this invention is an improved method of memory steering in a data processing system having a plurality of memory units.

Another object of the invention is a method of memory steering in a data system employing paged memory.

Still another object of the invention is a method of memory steering which is included in paged memory address development.

Features of the invention include providing in memory addresses a first address portion referencing either local or remote memory, a second address portion referencing specific local or remote memory depending upon the first address portion, and providing a third address portion indicating lack of memory residence of required data and effecting a system fault procedure. Accordingly, special processor configuration control logic is not required.

More specifically, in a paged memory environment page table words are utilized in developing memory addresses. Advantageously, the page table words may be stored in a processor scratchpad thereby minimizing the necessity of page table references in locating required page table words. The address portions for memory steering are provided in the page table words whereby memory steering and memory address development may be accomplished in the same procedure.

These and other objects and features of the invention will be more fully understood from the following detailed description and appended claims when taken with the drawings.

DESCRIPTION OF A PREFERRED ILLUSTRATIVE EMBODIMENT

Operating Environment - Input/Output System

An input/output processing system and processor in which the present invention may be employed, and which illustrates the preferred illustrative embodiment, operates in association with a main processor and memory of a large computer system to provide multiplexing and control of data transfers between peripheral devices (i.e., disk, tape, unit record, communications, etc.) and the central processing unit. Generally, its functions include the addressing and controlling of data transfers between peripheral devices and main memory.

Figure 1:
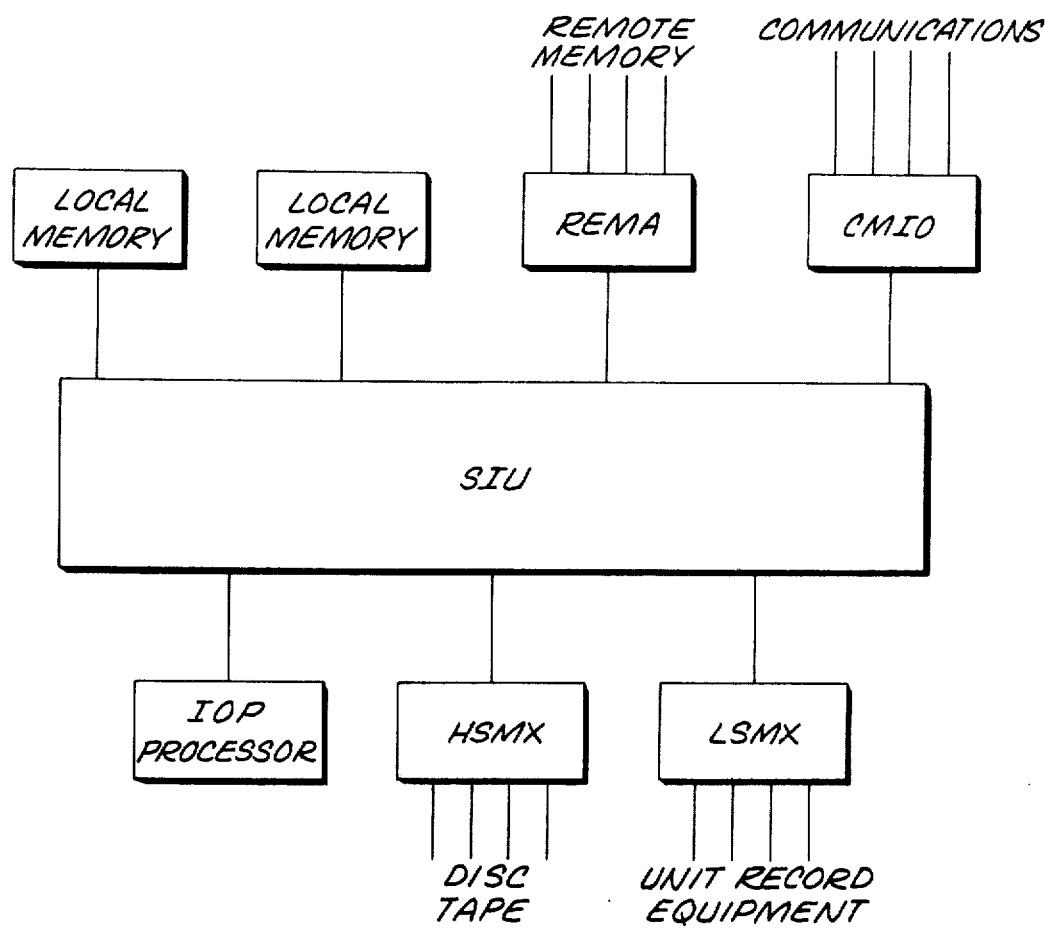
FIG. 1 is a functional block diagram of an input/output data processing system in which the present invention is applicable.

FIG. 1 is a block diagram of the input-output system. The central component of the I/O system is the system interface unit (SIU) which provides connections between the various components of the system. In addition to providing for access of local or remote memory by the active modules of the system, the SIU provides for direct addressing of the multiplexers and controller adaptors by the system processor. The SIU also controls the interrupt discipline of the system and performs processor dispatching as required.

System functions not directly involved with high-speed data transfers are performed by the system processor. These functions include initiation and termination of input/output command sequences, fetching, checking, translating channel programs, and direct control of low-speed peripheral devices such as unit record and data communications equipment. As will hereinafter be described in detail, the processor is general purpose including a complement of register-register, register-memory, immediate, branch, bit field, and shift instructions.

The communications input/output (CMIO) provides direct control of data transfers between communications line adaptors and the local IOP memory. Interaction with the IOP/P is necessary for data control.

The local memory in the IOP is organized as a two-port cross-barred read/write store with an optional cache. The remote memory adaptor (REMA) provides a means of exchanging control and data transfers between the IOP and the central system interface units.

The high-speed multiplexer (HSMX) provides direct control of data transfers between high-speed peripheral devices (disk/tape) and central or local memory. The low-speed multiplexer (LSMX) permits direct control by the IOP processor of low-speed devices, including unit record peripherals, consoles, and data communications adaptors.

Disk and tape devices are connected to the high-speed multiplexers by controller adaptors.

Performance and data transfer rates for the I/O system include a local memory cycle time of 140 nanoseconds with cache. The high-speed multiplexer channel rate is 5 megabits per second with a total through-put of a single HSMX of 10 megabytes per second. The low-speed multiplexer through-put is determined by attachments to its device adaptors, with a maximum burst data transfer rate of approximately 70,000 bytes per second. Total maximum input/output transfer rate is 30 megabytes per second for each REMA connected to the SIU.

Each active port of the SIU may include a data interface (DI) and a programmable interface (PI) for the attached device. For example, the HSMX will have a data interface for the high-speed transfer of data and a programmable interface for communication to and from the I/O system processor. The LSMX, on the other hand, has only a PI for data transfers and processor control of the CSMX. System memory port has a shared data and programmable interface.

Memory of the I/O system is paged. Therefore, memory addresses may be relative or paged addresses or absolute memory addresses. Memory specified by a paged address must be connected by the I/O processor to an absolute address before accessing stored information.

GENERAL DESCRIPTION OF PROCESSOR

Figure 2:
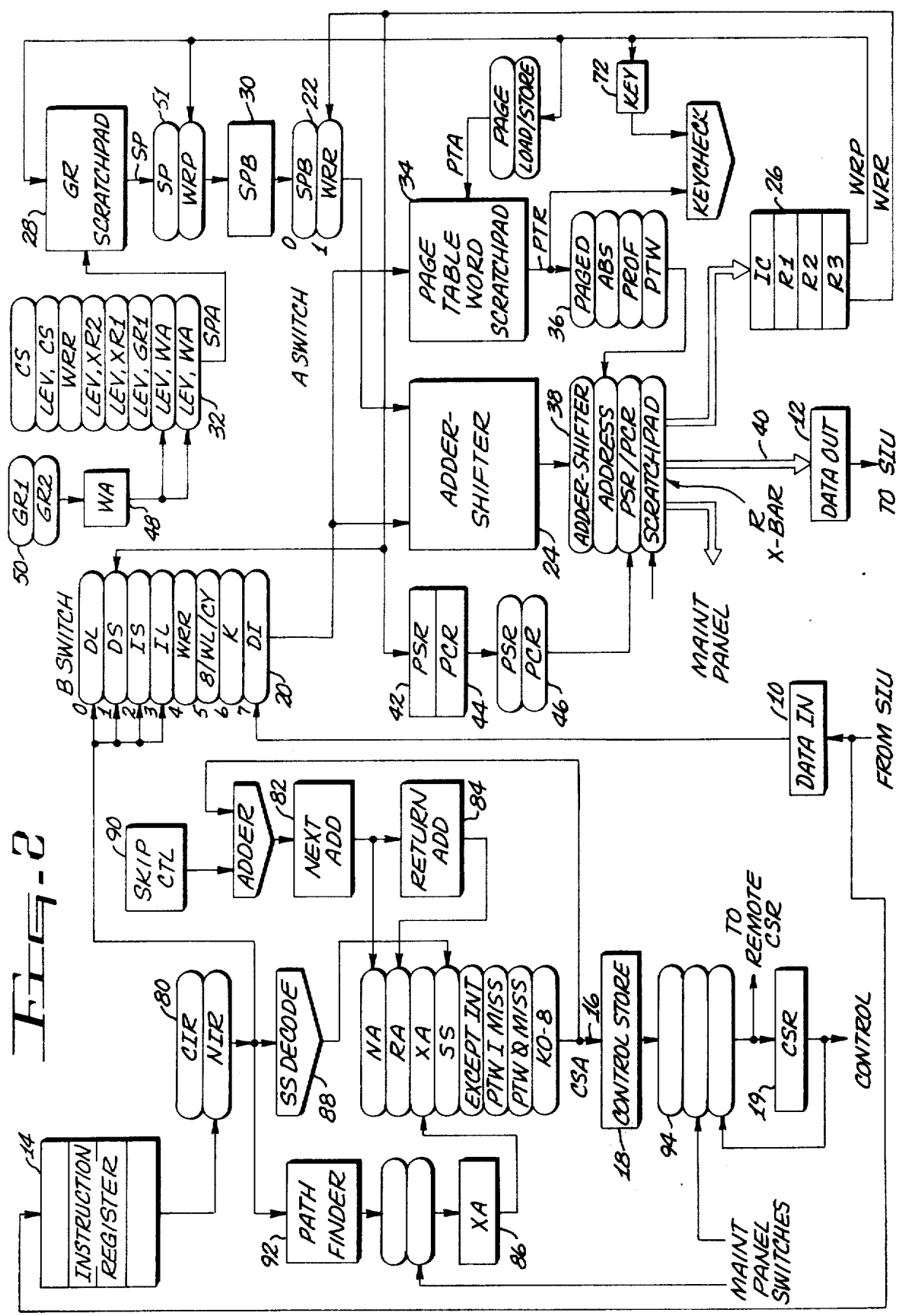
FIG. 2 is a functional block diagram of the processor of FIG. 1.

FIG. 2 is a functional block diagram of the processor in which the present invention is employed. Data and instructions from the system interface unit (SIU) are provided at register 10 and processed data is provided to the SIU at data-out register 12. As data and instructions are clocked into register 10 a parity check is made and parity errors are noted.

Instructions are placed in a look ahead dual read-out register 4 which provides four words of buffering for instructions. An 8-level control store address switch 16 provides an address to control store 18. One level of the CSA switch 16 is provided by the instruction register 14 via pathfinder unit 17. The control store 18 contains the microinstructions which control data manipulations, and an addressed microinstruction is stored in control store register 19.

Data from input register 10 is loaded into one level of the eight-level B switch 20 which, along with two-level A switch 22, provides operands for the adder/shifter network 24. The B switch 20 is controlled by a field in the control store register 19. A switch 22 provides inputs from the dual read-out working registers 26 or from general registers scratchpad 28 via SPB register 30. The dual read-out register 26 contains 3 working registers and an image of the instruction count (IC) contained in the general register scratchpad. The WRR output from working register 26 is supplied to A switch 22, and the WRP output from general register 26 is supplied to the general register scratchpad 28. A seven-bit address for the general register scratchpad is generated in a one of eight switch (SPA) 32.

The adder/shifter network 24 which receives operands from B switch 20 and A switch 22 performs all of the arithmetic, logical, and shift operations required for address development and instruction execution.

A page table word (PTW) scratchpad 34 provides storage of 16 page table words for each of the 8 levels of B switch 20. The four-level address switch 36 concatenates addresses for either programmable interface commands or read/write memory cycles (either paged or absolute).

Output from the adder/shifter network 24 may be supplied through a four-level output switch 38 to result crossbar (R-XBAR) 40 and to data output register 12. The R-XBAR provides simultaneous transfer of its input to both the data output register 12 and the working registers 26. Switch 38 also receives inputs from a process state register (PSR) 42, from a process control register (PCR) 44 through switch 46, and from the general register scratchpad 28.

A more detailed description of the system components is found in copending application Ser. No. 562,317.

ADDRESS DEVELOPMENT

Addresses generated in the IOP processor may refer to the IOP local memory, to the central system memory, to IOP registers outside the processor (external registers), to registers in the central system (remote registers), or to locations in one of the IOP/P scratchpads. Regardless of the type of storage to be referenced address development starts with the calculation of an effective address.

Effective Address Development - For most IOP/P instructions, calculation of the effective address starts with an Address Syllable (AS). If an instruction includes an Address Syllable, it occupies the field [14:22] and has the following format:

| AS: | XR₁ | 0 | S | | | D |
|---|---|---|---|---|---|---|
| | XR₁ | 1 | | XR₂ | S | D |
| | 14 17 | 18 | 19 | 22 | 23 | 35 |

Within the Address Syllable fields are interpreted as follows:

XR₁ [14:4] - This field specifies the general register to be used as the first-level index. A value of 0 indicates no first-level indexing.

Index Bit [18:1] - If this bit is 0, no second-level indexing is performed, and the long displacement is used. If the bit is 1, a second level of indexing is performed, and the short displacement is used.

XR₂ [19:4] - If the index bit is set, this field specifies the general register to be used as a second level index.

D [19:17] - If the index bit is not set, D is a 17-bit displacement value which is sign extended to 36 bits.

D [23:13] - If the index bit is set, the 13-bit displacement value D is sign-extended to 36 bits.

Instructions with format BRB also reference storage, but do not include an Address Syllable. In this format, the displacement in the instruction word field [19:17] is implicitly relative to the current value of the instruction counter (IC).

In summary, the effective address is a 36-bit sum, calculated from 36-bit addends in one of the following ways:

Instructions with an Address Syllable:
 No Index EA = D[19:17] sign-extended
 1 Index EA = (XR₁) + D[19:17] sign-extended
 2 Indices EA = (XR₁)+(XR₂) + D[23:13] sign-extended Instructions with format BRB
 (Implied Index) EA = (IC) + D[19:17] sign-extended Memory Reference Operations - All addresses generated by IOP/P memory reference instructions are byte addresses. Interpretation of the effective address depends on the setting of the address mode bit in the PSR.

Absolute Addresses - In absolute address mode, the effective address is also the absolute address. It is interpreted as follows:

| Absolute Address | 0 | 1 | 3 | 4 | | 8 | 9 | 35 |
|---|---|---|---|---|---|---|---|---|
| | | L/R | S | | RFU | | A | |

L/R [0:1] - Local/Remote. This bit specifies whether the memory request is to be directed to the IOP (local) memory (0), or a central system (remote) memory (1).

S [1:3] - Steering.

Local Memory References:
For references to local memory, the steering field is interpreted as follows:
Bit 1 - Local Memory Port
 Selection of the local memory port to be used by the IOP processor is controlled by Bit 1 in the two-port local memory configuration of FIG. 1.
Bits 2-3 - These bits need not be employed in the configuration of FIG. 1.

Remote Memory References:
For references to remote memory, the steering field is interpreted as follows:
Bit 1 - REMA Select
 Selection of one of two Remote Memory Adaptors is controlled by Bit 1.
Bits 2-3 - REMA port Select
 The Remote Memory Adaptor port is selected by Bits 2-3.

RFU [4:8] -Reserved for Future Use. This field is presently ignored by the hardware.

A [9:27] -Address. A 27-bit byte address specifying the location of a byte in the memory identified by the Local/Remote and Steering bits.

Paged Addresses - In paged mode, an address translation is applied to the effective address to produce an absolute address. The effective address is interpreted as follows:

| 0 | | 17 | 18 | | 24 | 25 | | 35 |
|---|---|---|---|---|---|---|---|---|
| | RFU | | | PN | | | PRA | |

RFU [0:18] - Reserved for Future Use. This field is presently ignored by the hardware.

PN [18:7] - Page Number. Up to 128 pages are available to each process. The page number is used to locate a Page Table Word (PTW) in the page table for this process.

PRA [25:11] - Page Relative Address. The PRA specifies a byte address within a 2K byte page (512 words).

Figure 3:
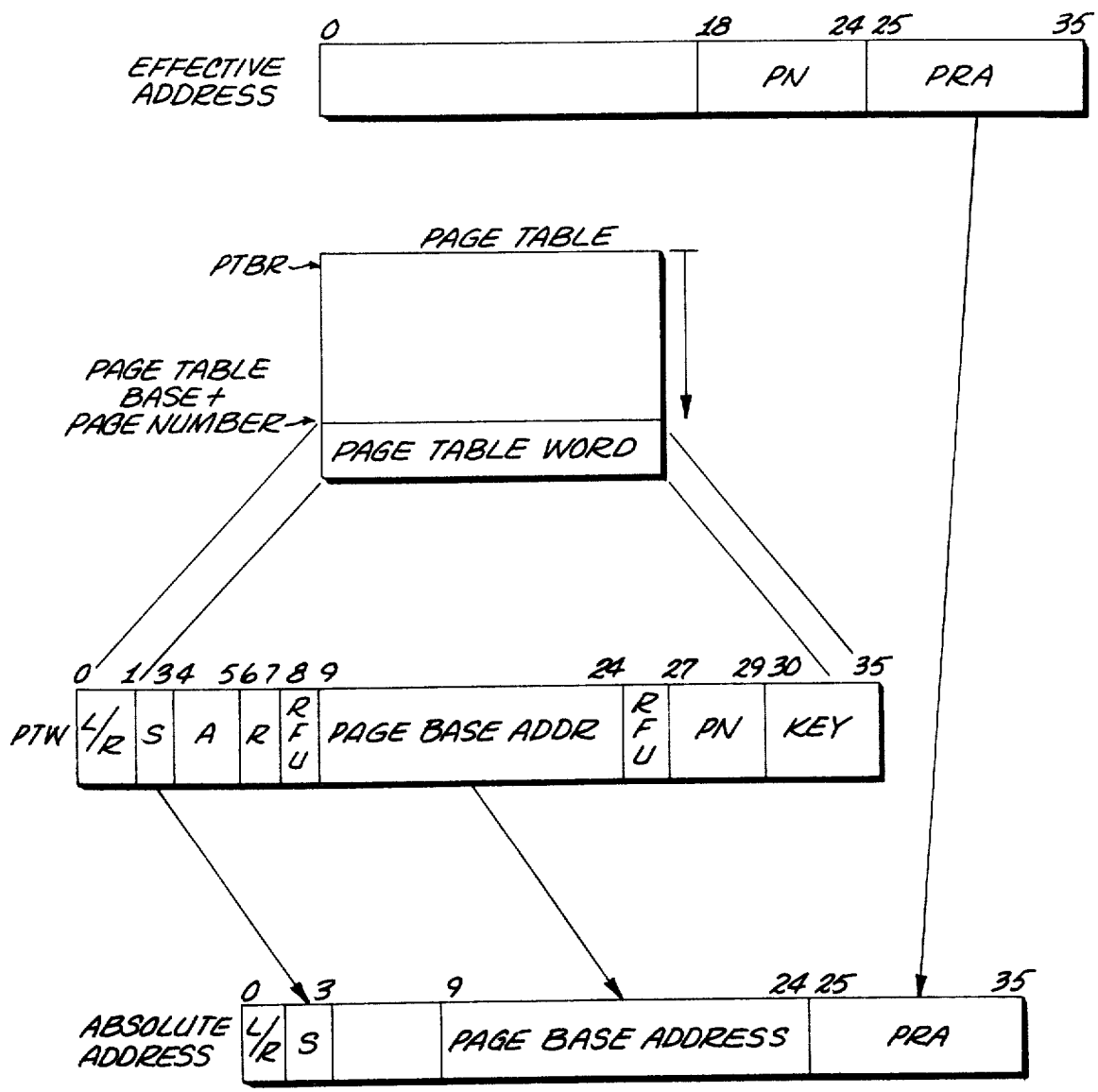
FIG. 3 is a schematic representation of paged mode address development using a page table as employed by the processor of FIG. 2.

Referring to FIG. 3, the absolute address may be developed by a conventional page table look-up mechanism using a page table in memory identified by the PTBR in the General Register Scratchpad 28. The page relative address and the page base address from the page table word (PTW) specified by the page number are concatenated to form the absolute address, as shown. The local/remote and steering fields in the absolute address are also supplied from the PTW.

Absolute Address [0:3] ← PTW [0:3]
Absolute Address [9:16] ← PTW [9:16]
Absolute Address [25:11] ← Effective Address [25:11]

The PTW address is computed by adding the page number to the page table base held in the page table base register (PTBR).

The PTW format is shown below:

| 0 | 1 | 3 | 4 5 | 6 | 7 8 | 9 | 24 | 25 26 | 27 | 29 30 | 35 |
|---|---|---|---|---|---|---|---|---|---|---|---|
| L/R | S | | A | R | RFU | PAGE BASE ADDRESS | | RFU | P | N | KEY |

L/R [0:1] - Local/Remote.
S [1:3] - Steering.
A [4:2] - Access. This field specifies the access privileges for this page:

| A | ACCESS PRIVILEGES |
|---|---|
| 00 | Read |
| 01 | Read, Write |
| 10 | Read, Execute |
| 11 | Read, Write, Execute |

R [6:1] - Residence. This bit is set to indicate that this page is present in memory.

RFU [7:2] - Reserved for future use.

Page Base Address [9:16] - This field specifies the absolute address of the first word of the page. Paged addresses are formed by concatenating the 16-bit Page Base Address and the 11-bit Page Relative Address.

RFU [25:2] - Reserved for future use.

PN 27:3] - This field is used to identify PTW's held in scratchpad storage. It must be equal to the three most significant bits of the page number.

KEY [30:6] - The key identifies the process with which this PTW is associated.

Figure 4:
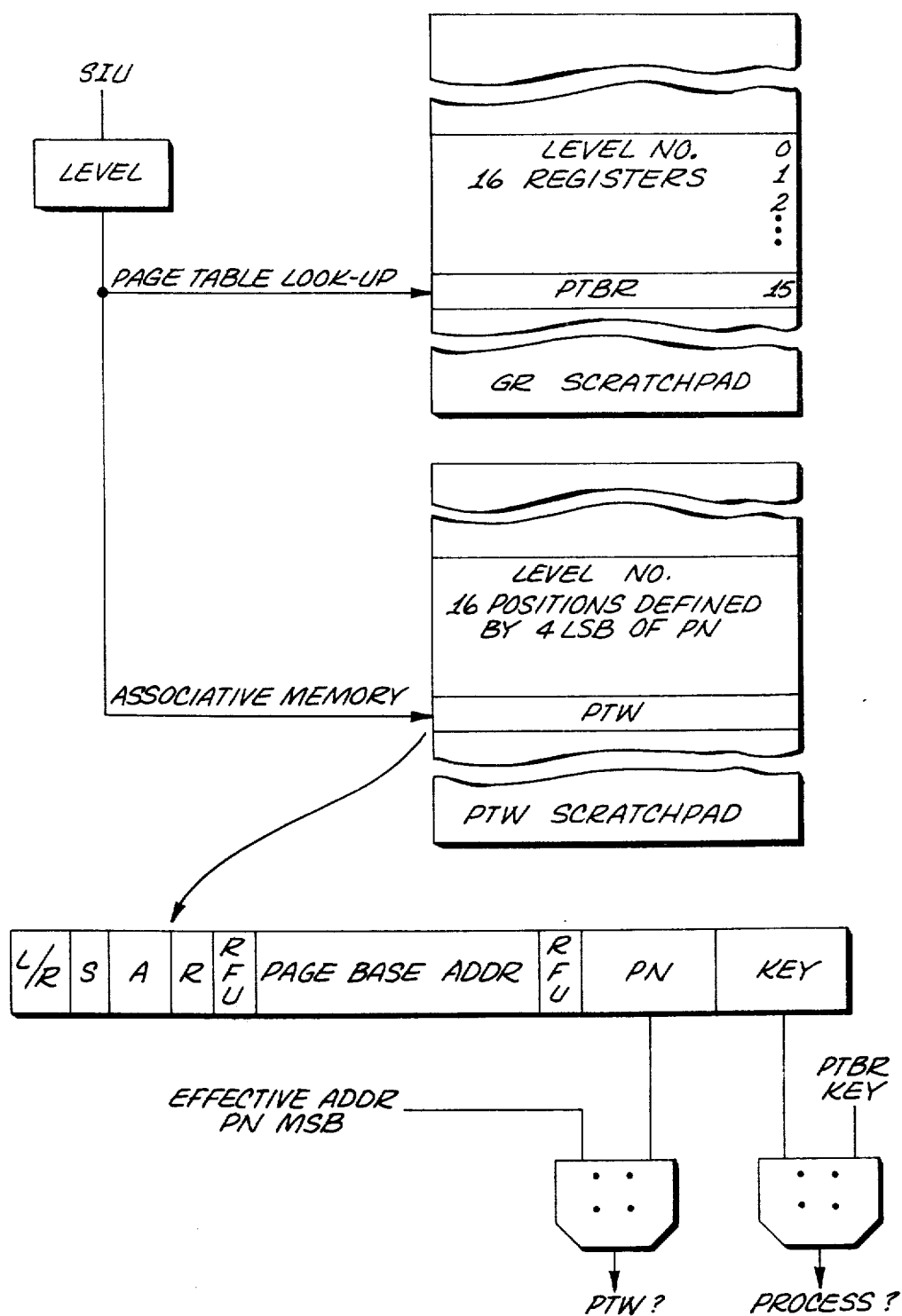
FIG. 4 is a schematic representation of address development using a PTW scratchpad memory and including memory steering in accordance with the present invention.

Since several processes may be in concurrent execution, an efficient page address mechanism is desirable without the necessity of employing the page table look-up illustrated in FIG. 3. In accordance with the invention of copending application Ser. No. 562,330 and as illustrated in FIG. 4 the PTW Scratchpad is utilized as an associative memory for each of eight levels. Each level may accommodate sixteen page table words (equivalent to approximately 8K of memory) which is sufficient memory space for most processes. Advantageously, PTWs in one level may be retained while a process at another level is in execution, thus allowing return to the first level for later process execution without the necessity for reloading the PTWs in the level.

According to the paged address development of application Ser. No. 562,330, the sixteen PTW spaces per level are directly accessed according to the four least significant bits of the page number in an effective address, thus eliminating the need for scanning the entire associative memory.

Upon location of the PTW at the space identified by the least significant bits of the page number, the key of the PTW is compared with the key of process in execution, stored in the PTBR, to verify that the PTW belongs to the process in execution. In addition, the three most significant bits of the effective address page number are compared with the three most significant bits in the PTW page number to verify that the correct page is identified. If either of the verification tests fails, then the PTW must be obtained from memory through the page table operation, as shown in detail in FIG. 3.

Since PTW scratchpad storage is provided for eight separate processes, according to priority levels, up to eight processes can be running concurrently. Further, since only a single PTW need be examined in using the associative memory of the PTW scratchpad memory, page address development in accordance with the invention is faster than conventional associative memory scanning.

As described above in the illustrative embodiment, memory steering is included in the memory address development and separate memory configuration logic is not required in the system processor. Accordingly, a savings in hardware and execution time is realized with the present invention.

While the invention has been described with reference to a specific system, the description is illustrative and is not to be construed as limiting the invention. Various modifications and changes may occur to those skilled in the art without departing from the true spirit and scope of the invention as defined by the appended claims.

What is claimed is:

1. In a data processing system comprising a plurality of local and remote type memories, a system interface unit which includes a plurality of local memory ports and a plurality of remote memory ports, said memory ports connected to said local and said remote memories respectively, and an input/output processor, the method of controlling data fetches employing a three part memory address comprised of:
    a. generating in said input/output processor a first address portion indicating the type of memory to be accessed;
    b. generating in said input/output processor a second address portion indicating which memory is to be accessed;
    c. generating in said input/output processor a third address portion to verify the memory address is indicating the correct page table word and page number; and
    d. obtaining by means of said interface unit the correct page table word and page number from remote memory if step c. does not verify that the correct page table word and page number was indicated.

2. The method of controlling data fetches as defined by claim 1, wherein said first and second address portions are included in page table words that identify the location of page data storage employed for absolute address development.

3. The method of controlling data fetches as defined by claim 2 wherein said first address portion is comprised of a single data bit and said second address portion is comprised of a plurality of data bits.

* * * * *